United States Patent
Frances et al.

(10) Patent No.: US 7,109,251 B2
(45) Date of Patent: *Sep. 19, 2006

(54) COMPOSITIONS BASED ON RADIATION-CURABLE FUNCTIONALIZED SILICONES AND ANTI-ADHESIVE COATINGS OBTAINED FROM SAME

(75) Inventors: Jean-Marc Frances, Meyzieu (FR); Véronique Hantin, Valencin (FR); Gérard Mignani, Lyons (FR); Michel Sciolla, Saint-Genis-les-Ollieres (FR); Lucile Gambut-Garel, Lyons (FR)

(73) Assignee: Rhodia Chimie, Boulogne-Billancourt Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/478,867

(22) PCT Filed: May 31, 2002

(86) PCT No.: PCT/FR02/01852

§ 371 (c)(1),
(2), (4) Date: Jun. 14, 2004

(87) PCT Pub. No.: WO02/096998

PCT Pub. Date: Dec. 5, 2002

(65) Prior Publication Data

US 2004/0214018 A1    Oct. 28, 2004

(30) Foreign Application Priority Data

Jun. 1, 2001   (FR) .................................. 01 07235

(51) Int. Cl.
C08F 2/46 (2006.01)
(52) U.S. Cl. ............................. 522/31; 522/99; 522/148

(58) Field of Classification Search .................. 522/31, 522/39, 64, 65, 66, 99, 169, 170, 148; 525/477, 525/476, 478; 428/447, 448

See application file for complete search history.

(56) References Cited

U.S. PATENT DOCUMENTS

| 5,397,813 A * | 3/1995 | Eckberg et al. ................ 522/31 |
| 5,591,783 A | 1/1997 | Kobayashi et al. |
| 5,721,291 A * | 2/1998 | Gaulle et al. .................. 522/38 |
| 5,866,261 A * | 2/1999 | Kerr et al. .................... 428/447 |
| 6,187,834 B1 * | 2/2001 | Thayer et al. ................. 522/15 |
| 6,875,795 B1 * | 4/2005 | Irifune .......................... 522/31 |

FOREIGN PATENT DOCUMENTS

| FR | 2731007 A | 8/1996 |
| WO | EP 0464706 A | 1/1992 |
| WO | WO 9733938 A | 9/1997 |
| WO | WO 9829498 A | 7/1998 |
| WO | WO 0130930 A | 5/2001 |

* cited by examiner

Primary Examiner—Margaret G. Moore
(74) Attorney, Agent, or Firm—Buchanan Ingersoll & Rooney, PC

(57) ABSTRACT

The invention concerns a radiation-curable silicone coating based on silicones having a viscosity not more than 1500 mPa's, radiation-curable, comprising: (a) at least a liquid polyorganopolysiloxane polymer Pa with viscosity higher than 500 mPa's and having at least a terminal unit of formula [Z—Si $(R^1)(R^2)$—O—] (I), and (b) at least a polyorganopolysiloxane Pb, with viscosity less than 150 mPa's and having at least a unit of formula (I) defined above and/or at least a unit of type D of formula —[—Si($R^1$)(Z)—O—]— (ii), Z being a crosslinkable and/or polymerizable group; (c) at least an efficient amount of at least an initiator consisting of onium borate.

15 Claims, No Drawings

COMPOSITIONS BASED ON RADIATION-CURABLE FUNCTIONALIZED SILICONES AND ANTI-ADHESIVE COATINGS OBTAINED FROM SAME

The present invention relates to novel silicone compositions that may be cured by UV irradiation and/or with a beam of electrons. More specifically, the invention relates to novel coating compositions based on a blend of polyorganosiloxanes with a viscosity of less than 1 500 mPa.s comprising at least one polyorganosiloxane Pa with at least one unit M bearing at least one reactive function, and at least one polyorganosiloxane Pb bearing at least one reactive function on at least one unit M or D; these functions being crosslinkable and/or polymerizable by UV irradiation or with a beam of electrons. These blends are efficiently crosslinked and/or polymerized by irradiation in the presence of compatible cationic initiators and are particularly suitable for their use in the field of release-paper supports.

It is known practice to use curable silicone compositions to render surfaces nonstick with respect to materials that would normally adhere thereto. To date, it is known practice to use cationic photocrosslinkable and/or photopolymerizable compositions to obtain coatings with release properties consisting of silicone oils or resins functionalized with epoxide, alkenyl ether oxetane, etc. functions.

Release coatings are useful for many applications in which it is necessary to render a surface or a material nonstick with respect to other materials that would normally adhere thereto.

For example, silicone compositions are used as coatings for release papers and may thus be combined with adhesive components that may readily be released without losing their adhesive properties, these components possibly being pressure-sensitive adhesives for labels, decorative laminates, transfer tapes, etc.

Silicone-based release coatings-applied to paper, polyethylene, polypropylene, polyester and other supports of this type are also useful as release surfaces for applications in the handling of food and industrial packaging. For example, when a label is coated with an adhesive and combined with a nonstick support, it is desirable for said label to be readily separated during its use, without the adhesion quality being diminished by the fact that it has been separated from the support. The same principle applies to certain tapes having a nonstick side and an adhesive side and which are supplied on reels. Specifically, it is necessary for the tape to unroll easily and to maintain its adhesive properties on the adhesive side after a long period of storage and possibly high pressure between the adhesive side and the nonstick side, since, especially, these reels may occasionally be more than one meter in diameter. Efforts are made to obtain these results by coating the nonstick support or the nonstick side of the tape with a silicone-based release composition that will subsequently come into reversible contact with the adhesive.

It is thus seen to be necessary that when silicone-based release coatings are combined with adhesives, they should give these combinations, known as silicone/adhesive complexes, a small peel force, which is stable over time, and stable irrespective of the pressure exerted between the release coating and the adhesive, while at the same time ensuring that the latter also maintains constant adhesion properties.

Moreover, release coatings must satisfy other conditions as best possible, and in particular they should cure rapidly and the initiator should be selected so as to be miscible with the silicones of the composition.

These objectives are, precisely, achieved and optimized according to the present invention. Specifically, the silicone compositions developed are specifically adapted for the preparation of release coatings and give silicone/adhesive complexes a small peel force; this peel force being stable on storage over time and stable irrespective of the pressure exerted between the release coating and the adhesive. Other advantages, and especially the improvement in the tack, rub-off and slip-stick properties, will emerge on reading the description.

Thus, one subject of the present invention is a crosslinkable and/or polymerizable composition for an irradiation-curable silicone-based release coating with a viscosity of less than or equal to 1 500 mPa.s, characterized in that it comprises:

(a) from 50% to 99% by weight and preferably 70% to 99% by weight of at least one linear, branched and/or cyclic liquid polyorganopolysiloxane polymer Pa with a viscosity of greater than 500 mPa.s and having at least one end unit of the type M of formula (I):

in which:
the symbols $R^1$ and $R^2$, which may be identical and/or different, represent:
  (i) a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl,
  (ii) an optionally substituted cycloalkyl radical containing between 5 and 8 ring carbon atoms,
  (iii) an optionally substituted aryl radical-containing between 6 and 12 carbon atoms, preferably phenyl or dichlorophenyl,
  (iv) an aralkyl portion having an alkyl portion containing between 5 and 14 carbon atoms and an aryl portion containing between 6 and 12 carbon atoms, optionally substituted on the aryl portion with halogens, alkyls and/or alkoxyls containing 1 to 3 carbon atoms,
  (v) a hydroxyl group OH or an alkoxyl group containing from 1 to 8 carbon atoms,
  (vi) a hydrogen radical,
the symbols Z, which may be identical and/or different, represent:
  a crosslinkable and/or polymerizable organofunctional group, preferably epoxy, acrylate, alkenyloxy and/or oxetane, the organofunctional group being linked to the silicon of the polyorganosiloxane via a divalent radical containing from two to twenty carbon atoms and possibly containing at least one hetero atom, preferably oxygen;

(b) from 1% to 50% by weight and preferably 1% to 30% by weight of at least one linear, branched and/or cyclic liquid polyorganopolysiloxane polymer Pb with a viscosity of less than 150 mPa.s and containing at least one end unit of the type M of formula (I) defined above and/or at least one unit of the type D of formula (II):

in which the symbols $R^1$ and Z, which may be identical or different, have definitions identical to those given above, (c) and an effective amount of at least one initiator consisting of an onium borate.

In general, the irradiation is performed by UV radiation and/or with a beam of electrons.

For the UV radiation, a wavelength of between 200 and 400 nanometers and preferably between 230 and 360 nanometers is used. The irradiation time may be short, i.e. less than 1 second, and of the order of a few hundredths of a second for thin coatings. The curing time is governed (a) by the number of UV lamps used, (b) by the time of exposure to the UV and/or (c) by the distance between the composition and the UV lamp.

For the beam of electrons, as examples of devices that may be used, mention will be made of those with a pulsed electron beam ("Scanned Electron Beam Accelerator") and those with an electron curtain beam ("Electron Curtain Accelerator").

The reactive functions Z may be of very varied structure. As examples of divalent radicals linking a functional group Z of the epoxy and/or oxetane type, mention may be made of those included in the following formulae:

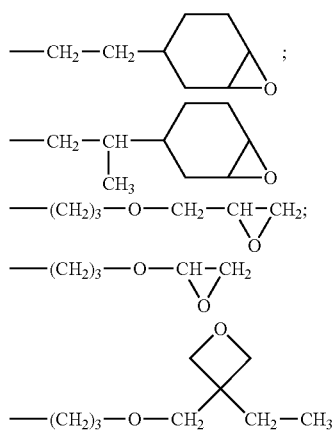

As regards the functional groups Z of the alkenyloxy type, mention may be made of those contained in the following formulae:

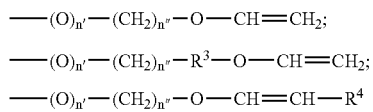

in which:
n' represents 0 or 1 and n" is an integer between 1 and 5
$R^3$ represents:
an optionally substituted linear, branched or cyclic $C_1$–$C_{12}$ alkylene radical,
or a $C_5$–$C_{12}$ arylene radical, preferably phenylene, which is optionally substituted, preferably with one to three $C_1$–$C_6$ alkyl groups,
$R^4$ represents a linear or branched $C_1$–$C_6$ alkyl radical.

As regards the functional groups Z of dioxolane type, mention may be made of those contained in the following formulae:

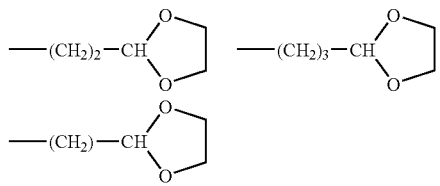

According to a first preferred mode, for the silicone Pa, it comprises only groups Z at the end of the chain.

According to a second preferred mode, the polyorganosiloxane Pa also comprises groups of the type D of formula (II).

According to a third preferred mode for the silicone Pa, the functions Z of the polymer Pa are polymerizable and/or crosslinkable functions of epoxy type.

According to a preferred mode for the silicone Pb, the functions Z of the polymer Pb are polymerizable and/or crosslinkable functions of epoxy type. More particularly, the polyorganosiloxanes Pb used comprise 4 to 6 organofunctional groups Z per macromolecular chain.

The onium borate used in the context of the present invention is carefully selected; specifically, it must be miscible with the blend of silicone constituents Pa and Pb and must thus be capable of satisfactorily dissolving or dispersing in the composition according to the invention. This onium borate is chosen from onium borates of an element from groups 15 to 17 of the Periodic Table [Chem. & Eng. News, vol. 63, No. 5, 26 of Feb. 4, 1985], in which:
the cationic species of the borate is selected from:
(1") the onium salts of formula (I):

$$[(R^5)_n\text{-}A\text{-}(R^6)_m]^+ \qquad (I)$$

in which formula:
A represents an element from groups 15 to 17, such as, for example: I, S, Se, P or N,
$R^5$ represents a $C_6$–$C_{20}$ carbocyclic or heterocyclic aryl radical, said heterocyclic radical possibly containing nitrogen or sulfur as hetero elements,
$R^6$ represents $R^5$ or a linear or branched $C_1$–$C_{30}$ alkyl or alkenyl radical; said radicals $R^5$ and $R^6$ optionally being substituted with a $C_1$–$C_{25}$ alkoxy, $C_1$–$C_{25}$ alkyl, nitro, chloro, bromo, cyano, carboxyl, ester or mercapto group,
n is an integer ranging from 1 to v+1, v being the valency of the element A,
m is an integer ranging from 0 to v−1 with n+m=v+1,
(2") the oxoisothiochromanium salts described in patent application WO 90/11303, especially the sulfonium salt of 2-ethyl-4-oxoisothiochromanium or of 2-dodecyl-4-oxoisothiochromanium,
and the anionic borate species has the formula $[BX'_a R^7_b]^-$ 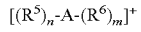 in which:
a and b are integers ranging from 0 to 3 for a and from 1 to 4 for b, with a +b=4,
the symbols X' represent:
a halogen atom (chlorine or fluorine) with a=0 to 3,
an OH function with a=0 to 2,
the symbols $R^7$, which may be identical or different, represent:
a phenyl radical substituted with at least one electron-withdrawing group such as, for example, $OCF_3$, $CF_3$, $NO_2$ or CN, and/or with at least 2 halogen atoms (most particularly fluorine), this being the case when the cationic species is an onium of an element from groups 15 to 17, a phenyl radical substituted with at least one electron-withdrawing element or group, especially a halogen atom (most particularly fluorine), $CF_3$, $OCF_3$, $NO_2$ or CN, this being the case when the cationic species is an organometallic complex of an element from groups 4 to 10, an aryl radical containing at least two aromatic nuclei, such as, for example, biphenyl or naphthyl, optionally substituted with at least one electron-withdrawing element or group, especially a halogen atom (most particularly fluorine), $OCF_3$, $CF_3$, $NO_2$ or CN, irrespective of the cationic species.

Without this being limiting, further details regarding the subclasses of onium borate that are more particularly preferred in the context of the compositions in accordance with the invention are given below.

According to a first preferred variant of the invention, the types of anionic borate species that are most particularly suitable are as follows:

1': $[B(C_6F_5)_4]^-$   5': $[B(C_6H_3(CF_3)_2)_4]^-$
2': $[(C_6F_5)_2BF_2]^-$  6': $[B(C_6H_3F_2)_4]^-$
3': $[B(C_6H_4CF_3)_4]^-$  7': $[C_6F_5BF_3]^-$
4': $[B(C_6F_4OCF_3)_4]^-$.

According to a second preferred variant of the invention, the onium salts (1) that may be used are described in many documents, especially in patents U.S. Pat. No. 4,026,705, U.S. Pat. No. 4,032,673, U.S. Pat. No. 4,069,056, U.S. Pat. No. 4,136,102 and U.S. Pat. No. 4,173,476. Among these, preference will be shown most particularly for the following cations:

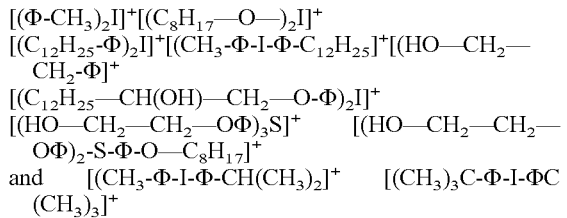

In accordance with these two preferred variants examples of initiators of onium borate type that may be mentioned include the following products:

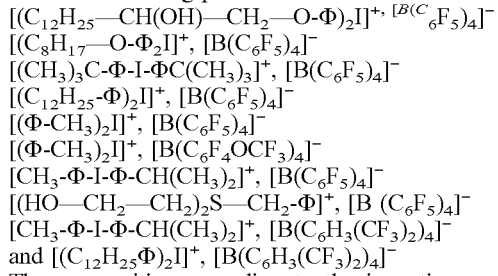

The composition according to the invention may also comprise additives such as, for example, stabilizers, bonding additives and (photo)sensitizers. The stabilizing additive may be-based on primary, secondary or tertiary amine; this amine is preferably chosen from the derivatives described in patent application WO 98/07798. The bonding additive is generally based on silanes and/or organic monomers. The (photo)sensitizer may be chosen, for example, from the benzophenone-type compounds described in patent application WO 99/05181.

A second aspect of the present invention relates to a silicone release/adhesive complex comprising at least one silicone coating applied to a first support and an adhesive coating optionally applied to a second support, characterized in that said silicone coating is derived from a blend of polyorganosiloxane(s) Pa and Pb in the presence of a miscible photoinitiator as defined above.

According to a first variant, the two supports consist of two different materials, arranged such that the silicone coating of the first support is in contact with the adhesive coating of the second support. This embodiment is illustrated in particular by self-adhesive label systems associated with a nonstick support. In this particular case, the peel force of the silicone/adhesive interface is exerted during the separation of the two supports.

In a second variant, the two supports each consist, respectively, of the two faces of the same material. This second embodiment is illustrated in particular by what are known as adhesive tape systems. The release coating, i.e. based on the silicone matrix, and the adhesive coating are placed in contact when the support is rolled up about itself. In this case, the peel force is exerted on the silicone/adhesive interface by the effect of separating a lower face from an upper face of the material.

As regards the adhesive coating, it may be of very diverse nature provided that it is chemically compatible with the silicone coating.

In the context of the present invention, said adhesive coating may in particular be chosen from adhesives of acrylic type, natural or synthetic gums and/or latices.

In general, the adhesive coatings deposited on the surface of a wide variety of materials so as to obtain labels, tapes or any other self-adhesive material are derived from emulsions referred to as pressure-sensitive adhesive (PSA) emulsions. They give the material the capacity to adhere to the surface of a support, without requiring any activation other than gentle pressure.

The monomers used to prepare the PSAs are selected as a function of their glass transition temperature, Tg, to give the polymers incorporating them the expected behavior in terms of adhesion and viscoelasticity. To this end, the monomers advantageously have a glass transition temperature that is sufficiently low, generally between $-70$ and $-10°$ C., and preferably less than $-30°$ C.

More specifically, these monomers are chosen from the group consisting of:

(meth)acrylic esters, for instance esters of acrylic acid and of methacrylic acid with hydrogenated or fluorinated $C_1$–$C_{12}$ and preferably $C_1$–$C_8$ alkanols, especially methyl acrylate, ethyl acrylate, propyl acrylate, n-butyl acrylate, isobutyl acrylate, 2-ethylhexyl acrylate, tert-butyl acrylate, hexyl acrylate, heptyl acrylate, octyl acrylate, isooctyl acrylate, decyl acrylate, dodecyl acrylate, methyl methacrylate, ethyl methacrylate, n-butyl methacrylate and isobutyl methacrylate;

vinyl nitriles including, more particularly, those containing from 3 to 12 carbon atoms such as, in particular, acrylonitrile and methacrylonitrile;

vinyl esters of carboxylic acids, for instance vinyl acetate, vinyl versatate and vinyl propionate, unsaturated ethylenic monocarboxylic and dicarboxylic acids, for instance acrylic acid, methacrylic acid, itaconic acid, maleic acid, fumaric acid and monoalkyl and dialkyl esters of the monocarboxylic and dicarboxylic acids of the type mentioned with alkanols preferably containing 1 to 8 carbon atoms, and N-substituted derivatives thereof, amides of unsaturated carboxylic acids., for instance acrylamide, methacrylamide, N-methylolacrylamide or N-methylolmethacrylamide, and N-alkylacrylamides, ethylenic monomers comprising a sulfonic acid group and the alkali metal or ammonium salts thereof, for example vinylsulfonic acid, vinylbenzenesulfonic acid, α-acrylamidomethylpropane-sulfonic acid and 2-sulfo-ethylene methacrylate, unsaturated ethylenic monomers comprising a secondary, tertiary or quaternary amino group, or a heterocyclic group containing nitrogen, such as, for example, vinylpyridines, vinylimidazole, aminoalkyl (meth)acrylates and aminoalkyl (meth)acrylamides, for instance dimethylaminoethyl acrylate or dimethylaminoethyl methacrylate, di-tert-butylaminoethyl acrylate or di-tert-butylaminoethyl methacrylate, dimethylaminomethylacrylamide or dimethylaminomethylmethacrylamide, zwitterionic monomers such as, for example, sulfopropyl (dimethyl)aminopropyl acrylate, ethylenic monomers bearing a sulfate group, ethylenic monomers bearing one or more phosphate and/or phosphonate function(s), and mixtures thereof.

Conventionally, the PSAs are obtained by polymerization predominantly of alkyl acrylate monomers that are generally present in a proportion of from 50% to about 99% and preferably in a proportion of from 80% to 99% by weight, and of copolymerizable polar monomers such as, for example, acrylic acid, in smaller proportions.

In the context of the present invention, a peel force generally of less than 20 g/cm and more frequently a peel force of less than 10 g/cm is obtained.

In general, the force required to peel the silicone release coating from the adhesive changes at most by a factor of less than 4 and more frequently less than 2, after the aging test of 7 days at 70° C., which is representative of aging for 6 months.

This peel force also does not change, and at most changes by a factor of less than 2, irrespective of the pressure exerted between the adhesive and the silicone release coating.

EXAMPLES

1. Preparation of the Coating Compositions

The compositions according to the invention and, by way of reference, are prepared from the compounds below. These compositions are described in table 1.

The silicones for the reference compositions are chosen from silicones $Re_1$ and $Re_2$ of formula (III) below:

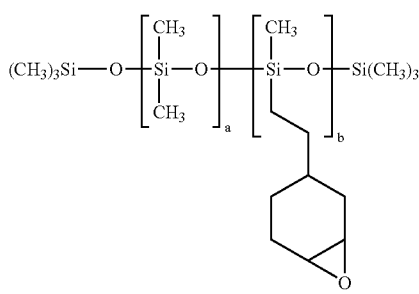

in which:
$a=80$, $b=7$ and the viscosity=350 mPa.s for $Re_1$, and
$a=222$, $b=3$ and the viscosity=1 000 mPa.s for $Re_2$.

The silicones of the type Pb are chosen from the silicone Re1 and the silicone $Pb_1$ of formula (IV) below:

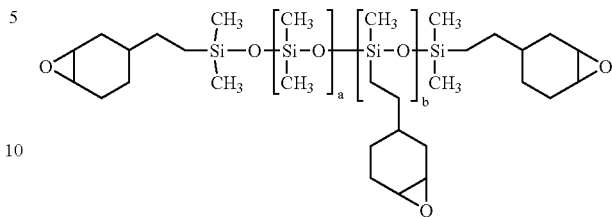

in which:
$a=11$, $b=0$ and the viscosity=30 mPa.s.

The silicones of the type Pa are chosen from the silicones $Pa_1$, $Pa_2$ and $Pa_3$ of formula (IV) in which:
$a=450$, $b=1.5$ and the viscosity=4 710 mPa.s ±300 for $Pa_1$, and
$-a=243$, $b=0$ and the viscosity=1 050 mPa.s ±300 for $Pa_2$, and
$-a=400$; $b=0$ and the viscosity=3 500 mPa.s ±300 for $Pa_3$.

The photoinitiator Am used is in solution at 18% in isopropanol and corresponds to the formula:

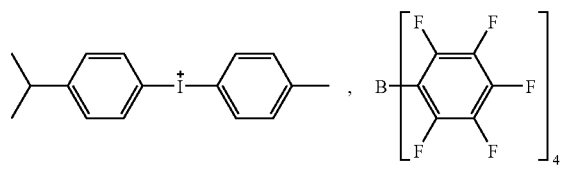

2. Polymerization of the Compositions (i) The compositions prepared are deposited at a rate of 0.8 g/m² onto a film of PET6001 polyester from the company Toray and then irradiated at a speed of 200 m/min under two mercury lamps [power 360 W/cm (H⁺), Fusion company].

After exposure to UV light, the coatings obtained are totally dry.

3. Tests (i) Release Silicone/Adhesive Complexes

The coatings obtained are then combined with the following adhesives:

adhesive based on rubber compounds: TESA 4651® from the company Beiersdorf, adhesive based on acrylic compounds and formulated in solvent phase: TESA 4970® from the company Beiersdorf, and adhesive based on acrylic compounds and formulated in aqueous phase at 50% in water: Rhodotak 315P® from the company Rhodia Chimie.

(ii) Measurements

The peel force of the various complexes obtained is measured after storage for 20 hours at 20° C. according to the standardized test FINAT3 under a force of 70 g/cm² with a peel rate of 300 mm/min.

The peel force is also measured after 7 days at 70° C., which simulates aging for 6 months at 20° C. under pressure conditions of 70 g/cm².

In addition, the tack, rub-off and slip-stick properties are evaluated.

The rub-off characterizes the attachment of a silicone coating to a support. It is measured by a test of the art that consists in passing the finger back and forth up to 10 times over the silicone coating, applying gentle pressure with the finger. If the finger does not attach to the coating after 10 return passes, the grade is 10. If the finger becomes attached (rub-off) after 5 return passes, the grade is 5. If the layer is detached on the first return pass, the grade is 0 or 1; the grade 0 means that the coating does not stay on the support used. The instantaneous adhesion or "tack" characterizes the force required to separate, at a speed of about 300 mm/min, an adhesive tape placed in contact with the silicone coating of the invention according to the standardized test FINAT 9.

The results of the tests are given in table 2.

TABLE 1

| Compositions | Re1 | Re2 | Pa1 | Pa2 | Pa3 | Pb1 | Am |
|---|---|---|---|---|---|---|---|
| 1 (comparative) | 95 | 5 | 0 | 0 | 0 | 0 | 2.5 |
| 2 | 10 | 0 | 0 | 60 | 0 | 30 | 2.5 |
| 3 | 0 | 0 | 0 | 70 | 0 | 30 | 2.5 |
| 4 (comparative) | 70 | 0 | 0 | 30 | 0 | 0 | 2.5 |
| 5 | 10 | 0 | 60 | 0 | 0 | 30 | 2.5 |
| 6 | 10 | 0 | 0 | 0 | 60 | 30 | 2.5 |
| 7 | 0 | 0 | 70 | 0 | 0 | 30 | 2.5 |

TABLE 2

| Crosslinked composition/ adhesive complex | Deposition g/m² | Tack N/inch | Rub-off | Slip-stick | Finat 3 CN/cm | 7 days at 70° C. cN/cm |
|---|---|---|---|---|---|---|
| compl.1/adhesive R315P (comparative) | 1.1 | / | no | yes | 3.1 | 50 |
| compl.2/adhesive R315P | 1.0 | / | no | no | 1.8 | 6.5 |
| compl.3/adhesive R315P | 1.0 | / | yes | no | 1.3 | 8.7 |
| compl.1/adhesive Tesa4970 (comparative) | 1.0 | 38 | no | yes | 5.2 | 8.9 |
| compl.4/adhesive Tesa4970 (comparative) | 1.0 | 35 | yes | yes | 6 | 12 |
| compl.2/adhesive Tesa4970 | 1.0 | 38 | no | no | 4.5 | 8.2 |
| compl.5/adhesive Tesa4970 | 1.0 | 38 | no | no | 3.6 | 7.5 |
| compl.6/adhesive Tesa4970 | 1.0 | 40 | no | no | 3.7 | 8.3 |
| compl.7/adhesive Tesa4970 | 1.0 | 41 | no | no | 3.3 | 7.1 |
| compl.1/adhesive Tesa4651 (comparative) | 1.0 | 25 | no | yes | 6.3 | 6.5 |
| compl.6/adhesive Tesa4651 | 1.0 | 23 | no | no | 3.6 | 3.3 |

The invention claimed is:

1. An irradiation-curable silicone-based coating composition with a viscosity of less than or equal to 1 500 mPa.s, which comprises:

(a) from 50% to 99% by weight of at least one linear, branched and/or cyclic liquid polyorganopolysiloxane polymer Pa with a viscosity of greater than 500 mPa.s and having at least one end unit of the type M of formula (I):

$$[Z-Si(R^1)(R^2)-O-] \quad (I)$$

in which:

the symbols $R^1$ and $R^2$, which may be identical and/or different, represent:

(i) a linear or branched alkyl radical containing 1 to 8 carbon atoms, optionally substituted with at least one halogen, (ii) an optionally substituted cycloalkyl radical containing between 5 and 8 ring carbon atoms, (iii) an optionally substituted aryl radical containing between 6 and 12 carbon atoms, (iv) an aralkyl portion having an alkyl portion containing between 5 and 14 carbon atoms and an aryl portion containing between 6 and 12 carbon atoms, optionally substituted on the aryl portion with halogens, alkyls and/or alkoxyls containing 1 to 3 carbon atoms, (v) a hydroxyl group OH or an alkoxyl group containing from 1 to 8 carbon atoms, (vi) a hydrogen radical, the symbols Z, which may be identical and/or different, represent:

a crosslinkable and/or polymerizable organofunctional group the organofunctional group being linked to the silicon of the polyorganosiloxane via a divalent radical containing from two to twenty carbon atoms and optionally containing at least one hetero atom;

(b) from 1% to 50% by weight of at least one linear, branched and/or cyclic liquid polyorganopolysiloxane polymer Pb with a viscosity of less than 150 mPa.s and containing at least one end unit of the type M of formula (I) defined above and/or at least one unit of the type D of formula (II):

$$-[-(Si(R^1)(Z)-O-]- \quad (II)$$

in which the symbols $R^1$ and Z, which may be identical or different, have definitions identical to those given above (c) and an effective amount of at least one initiator comprising an onium borate.

2. The composition as claimed in claim 1, wherein the polyorganosiloxane Pa comprises only groups Z at the end of the chain.

3. The composition as claimed in claim 1, wherein the polyorganosiloxane Pa also comprises groups of the type D of formula (II).

4. The composition as claimed in claim 1, wherein the function Z of the polymer Pa is a polymerizable and/or crosslinkable function of epoxy type.

5. The composition as claimed in claim 1, wherein the function Z of the polymer Pb is a polymerizable and/or crosslinkable function of epoxy type.

6. The composition as claimed in claim 1, wherein the function Z is selected from the group consisting of epoxy and/or alkenyl ether and/or oxetane and/or dioxolane functions.

7. The composition as claimed in claim 1, wherein the onium borate is selected from the onium borates of an element from groups 15 to 17 of the Periodic Table or of an organometallic complex of an element from groups 4 to 10 of the Periodic Table, of which:

the cationic species of the borate is selected from:

(1") the onium salts of formula (I):

$$[(R^5)_n-A-(R^6)_m]+ \quad (I)$$

in which formula:

A represents an element from groups 15 to 17, such as, for example: I, S, Se, P or N, R⁵ represents a $C_6$–$C_{20}$ carbocyclic or heterocyclic aryl radical, said heterocyclic radical possibly containing nitrogen or sulfur as hetero elements, R⁶ represents R⁵ or a linear or branched $C_1$–$C_{30}$ alkyl or alkenyl radical; said radicals R⁵ and R⁶ optionally being substituted with a $C_1$–$C_{25}$ alkoxy, $C_1$–$C_{25}$ alkyl, nitro, chloro, bromo, cyano, carboxyl, ester or mercapto group, n is an integer ranging from 1 to v+1, v being the valency of the element A, m is an integer ranging from 0 to v−1 with n+m=v+1, (2″) an oxoisothiochromanium salt, and the anionic borate species has the formula $[BX'_a R^7_b]$ in which:

a and b are integers ranging from 0 to 3 for a and from 1 to 4 for b, with a+b=4, the symbols X″ represent:

a halogen atom (chlorine or fluorine) with a=0 to 3, an OH function with a=0 to 2, the symbols R⁷, which may be identical or different, represent:

a phenyl radical substituted with at least one electron-withdrawing group, and/or with at least 2 halogen atoms, this being the case when the cationic species is an onium of an element from groups 15 to 17, a phenyl radical substituted with at least one electron-withdrawing element or group, this being the case when the cationic species is an organometallic complex of an element from groups 4 to 10, an aryl radical containing at least two aromatic nuclei.

8. A release coating that may be obtained by crosslinking and/or polymerization using compositions as claimed in claim 1.

9. A silicone release/adhesive complex comprising at least one silicone coating applied to a first support and an adhesive coating applied to a second support, wherein said silicone coating is derived from a composition as claimed in claim 1.

10. The composition as claimed in claim 1, comprising 70% to 99% by weight of the at least one linear, branched and/or cyclic liquid polyorganosiloxane polymer Pa.

11. The composition as claimed in claim 1, wherein when R¹ and/or R² is a linear or branched alkyl radical containing 1 to 8 carbon atoms and is optionally substituted with at least one halogen, the at least one halogen is a fluorine.

12. The composition as claimed in claim 1, wherein when R¹ and/or R² is a linear or branched alkyl radical, the alkyl radical is selected from the group consisting of methyl, ethyl, propyl, octyl, and 3,3,3-trifluoropropyl.

13. The composition as claimed in claim 1, wherein when R¹ and/or R² is an optionally substituted aryl radical containing between 6 and 12 carbon atoms, the aryl radical is phenyl or dichlorophenyl.

14. The composition as claimed in claim 1, comprising 1% to 30% by weight of the at least one linear, branched and/or cyclic liquid polyorganosiloxane polymer Pb.

15. The composition as claimed in claim 7, wherein the oxoisothiochromanium salt is a sulfonium salt of 2-ethyl-4-oxoisothiochromanium or 2-dodecyl-4-oxoisothiochromanium.

* * * * *